E. W. HESSEL.
AUTOMOBILE LOCK.
APPLICATION FILED JUNE 30, 1920.
1,392,158.
Patented Sept. 27, 1921.
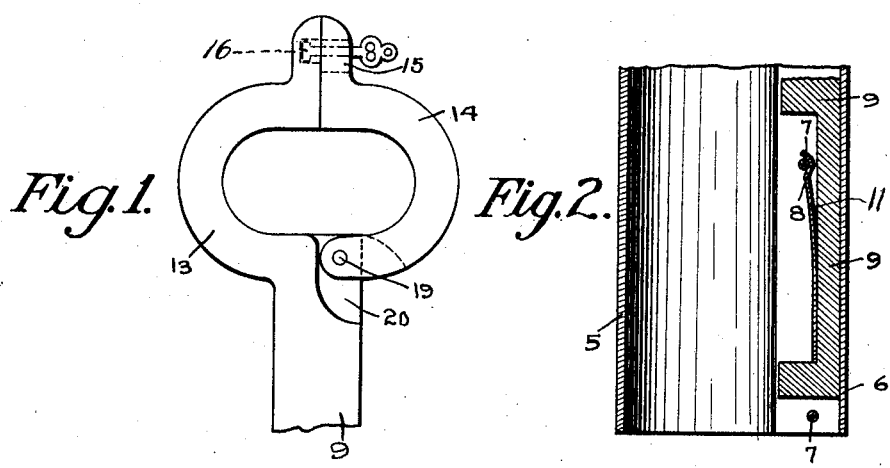
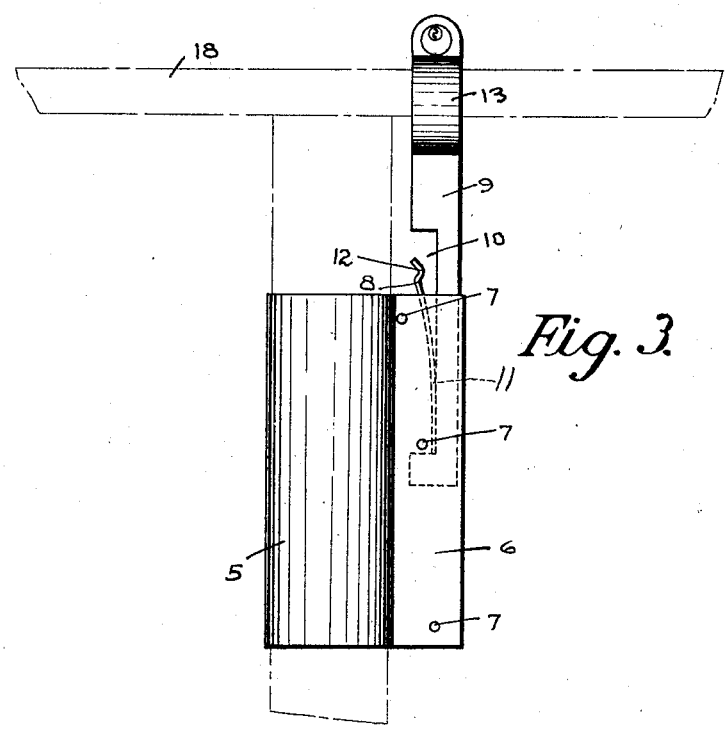
Inventor
E. W. HESSEL.

UNITED STATES PATENT OFFICE.

EMIL WILLIAM HESSEL, OF GRANITE CITY, ILLINOIS.

AUTOMOBILE-LOCK.

1,392,158.  Specification of Letters Patent.  Patented Sept. 27, 1921.

Application filed June 30, 1920. Serial No. 393,024.

*To all whom it may concern:*

Be it known that I, EMIL WILLIAM HESSEL, a citizen of the United States, residing at Granite City, in the county of Madison and State of Illinois, have invented a new and useful Automobile-Lock, of which the following is a specification.

The present invention relates to automobile locks, and more particuarly to locks employed in connection with the usual steering wheel of an automobile for locking the steering wheel against movement, thereby preventing unauthorized persons from moving the automobile.

The primary object of the invention is to provide a lock of this character which may be easily applied to the usual steering column, of an automobile for locking the steering wheel to the steering column.

A further object of the invention is to construct a locking element which may be readily moved out of engagement with the steering wheel, when the device is out of use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed.

Referring to the drawing:—

Figure 1 illustrates a fragmental side elevational view of the locking arm.

Fig. 2 illustrates a longitudinal sectional view of the base or supporting collar, and Fig. 3 illustrates a side elevational view of the base showing the invention as applied to a steering column, the locking arm being in its locked position.

Referring to the drawing in detail, the reference character 5 designates the base, which is in the form of a relatively long metallic collar having right angled flanges 6 forming a housing for the locking arm to be hereinafter more fully described.

Securing pins 7 pass through the flanges 6, for securing the side walls of the housing together, the central securing pin acting as a keeper for the leaf spring 8, for securing the locking arm against displacement, and to prevent rattling of the locking arm 9, which, in operation is housed by the housing formed by the flanges.

This locking arm 9 is provided with a cut out portion 10, formed in one of the side edges thereof, in which cut out portion is seated the leaf spring 11, that is provided with a depressed portion 12 adapted to engage the central securing pin for tensioning the spring 11 in a manner to restrict movement of the arm 9 within its housing.

Formed at the upper end of the arm 9 is a locking member which includes an integral portion 13, and a movable portion 14, each portion being curved so that when the ends of the locking member are brought together, as shown by Fig. 1 of the drawings, the T-shaped head 16 of the barrel lock 15 may be moved within its keeper, with the result that the locking member is locked around one of the spokes of the steering wheel indicated at 18.

It might be further stated that the member 14 is pivotally connected to the arm 9 as at 19, the arm 9 having a cut away portion 20 to permit the removable member 14 to hinge downwardly to permit the device to be positioned around one of the spokes of the steering wheel.

From the foregoing it is obvious that when it is desired to use the steering wheel, to accomplish the steering result, the member 14 is moved downwardly to release the locking arm, whereupon the arm 9 is moved to a position as indicated by Fig. 2 with the result that the elements of the device are maintained in a rigid position to prevent rattling thereof.

Having thus described the invention, what is claimed as new is:—

In combination with a steering column, and the steering wheel supported at one end thereof, a locking device including a tubular body portion having flanges, means extending through the flanges for securing the flanges together to provide a housing, a locking arm disposed within the housing and having a cut out portion providing a pocket, a leaf spring disposed within the pocket and having one extremity thereof extending toward the tubular portion of the locking device, said extended portion of the spring having an offset portion, designed to engage the flange securing means, and locking means disposed at one end of the locking arm for locking the wheel against rotation.

In testimony that I claim the foregoing as my own, I have hereto affixed my signature in the presence of two witnesses.

EMIL WILLIAM HESSEL.

Witnesses:
J. H. O'NEIL,
OTTO KNIPPING.